United States Patent [19]

Isani

[11] Patent Number: 5,452,235
[45] Date of Patent: Sep. 19, 1995

[54] PLANAR/PACKED VIDEO DATA FIFO MEMORY DEVICE

[75] Inventor: Tarik Isani, Santa Clara, Calif.

[73] Assignee: Intel Corp., Santa Clara, Calif.

[21] Appl. No.: 146,416

[22] Filed: Nov. 1, 1993

[51] Int. Cl.$^6$ .......................................... H04N 11/22
[52] U.S. Cl. ....................... 364/514 R; 348/429;
348/718; 395/115; 345/201; 345/202
[58] Field of Search ................ 364/514; 348/426, 429,
348/432, 581, 718; 370/60, 60.1; 395/114, 115;
341/60; 345/198, 200, 201, 202

[56] References Cited

U.S. PATENT DOCUMENTS 4,688,100 8/1987 Haganuma et al. ............... 358/261.1
5,159,447 10/1992 Haskell et al. ...................... 348/419
5,220,410 6/1993 Wakeland et al. .................. 348/472

*Primary Examiner*—Emanuel T. Voeltz
*Assistant Examiner*—Edward Pipala
*Attorney, Agent, or Firm*—Steve Mendelsohn; William H. Murray

[57] ABSTRACT

A memory device for a digital video system, capable of receiving video data in a packed format and transmitting that video data in a planar format. In other operating modes, the memory device receives video data in various packed formats and transmits that video data in a packed format. The memory device is suitable for a flexible digital video system in which video data may either be displayed in real time as it is generated (using packed format data) or compressed for storage and future display (using planar format data).

7 Claims, 10 Drawing Sheets

(RGB 24 PACKED MODE)

FIG. 5
(YUV 16 PACKED MODE)

(YUV 16 PLANAR MODE)

(YUV12 PLANAR MODE - ODD ROW)

(YUV12 PLANAR MODE – EVEN ROW)

(YUV9 PLANAR MODE - ROW 1)

(YUV9 PLANAR MODE - ROWS 2-4)

PLANAR/PACKED VIDEO DATA FIFO MEMORY DEVICE

BACKGROUND OF THE INVENTION

1. Field of the Invention

The present invention relates to digital video, and, in particular, to memory devices for storing and processing video pixel data.

2. Description of the Related Art

In digital video systems, images are represented by arrays of pixels (i.e., picture elements). Each pixel is typically represented by three values, e.g., red R, green G, and blue B values in the RGB system or one luminance value Y and two chrominance values U and V in the Phase Alternating Line (PAL) or YUV system.

As digital video images are generated by a video capture source (e.g., a CCD-based video camera), pixel data may be transmitted from the video capture source in a packed format. In a packed format, all the data for a given pixel are transmitted before any data for another pixel are transmitted. As a result, in packed format, the pixel components (e.g., RGB or YUV) are interleaved in the pixel data stream transmitted by the video capture source.

Graphic displays in conventional digital video systems receive and display video data in a packed format. Thus, when video images generated by a video capture source are displayed in real time on a graphic display, the video data are preferably transmitted to the graphics frame buffer of the graphic display in a packed format.

As an alternative to immediate display, video data may be stored in memory for future display. To store video data efficiently (i.e., utilizing minimal storage capacity), conventional digital video systems contain a data compressor that compresses the video data using compression techniques. Many conventional compression techniques are based on compressing the video data by processing the different pixel components separately. For example, a YUV-data compressor may run-length encode the Y data independently of a run-length encoding of the U data and a run-length encoding of the V data. Such a compressor preferably receives video data in a planar format, in which the Y, U, and V data for multiple pixels are separated and grouped together in three distinct data streams of only Y, only U, and only V data.

"Packed" memory devices exist for receiving video data from a video capture source in a packed format and for transmitting video data in a packed format for display on a graphic display. In addition, "planar" memory devices exist for receiving video data from a video capture source in a packed format and for transmitting video data in a planar format for compression by a video compressor. However, known packed memory devices cannot transmit planar-format data and known planar memory devices cannot transmit packed-format data.

It is desirable to build a digital video system that has the flexibility of either displaying video data immediately on a graphic display or compressing video data for storage with a data compressor. Since known packed memory devices transmit only packed data and since known planar memory devices transmit only planar data, such a flexible digital video system has conventionally contained both types of memory devices. Such systems make inefficient use of memory resources, since each of the two memory devices has its own independent memory allocation.

It is accordingly an object of this invention to overcome the disadvantages and drawbacks of the prior art and to provide a single memory device that transmits either packed-format data for display or planar-format data for compression, in a flexible digital video system.

It is a further object of this invention to improve the memory usage efficiency of a digital video system that can either display video images in real time as they are generated or compress video data for storage for future display.

Further objects and advantages of this invention will become apparent from the detailed description of a preferred embodiment which follows.

SUMMARY OF THE INVENTION

The present invention is an apparatus for converting video data from a packed format to a planar format. The apparatus includes a pixel router for receiving video data in a packed format and for transmitting the video data. The apparatus also includes three first-in, first-out memory devices, each of which receives video data from the pixel router and transmits the video data. The depth of the second memory device is equal to the depth of the third memory device and the depth of the first memory device is $2^n$ times the depth of the second memory device, where n is a non-negative integer. The apparatus also includes a data multiplexer for receiving the video data from the three memory devices and for transmitting the video data in a planar format to a data bus.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 5 is a representation of the processing of the memory device of FIG. 2 in YUV16 packed mode;

DESCRIPTION OF THE PREFERRED EMBODIMENT(S)

Figure 1:
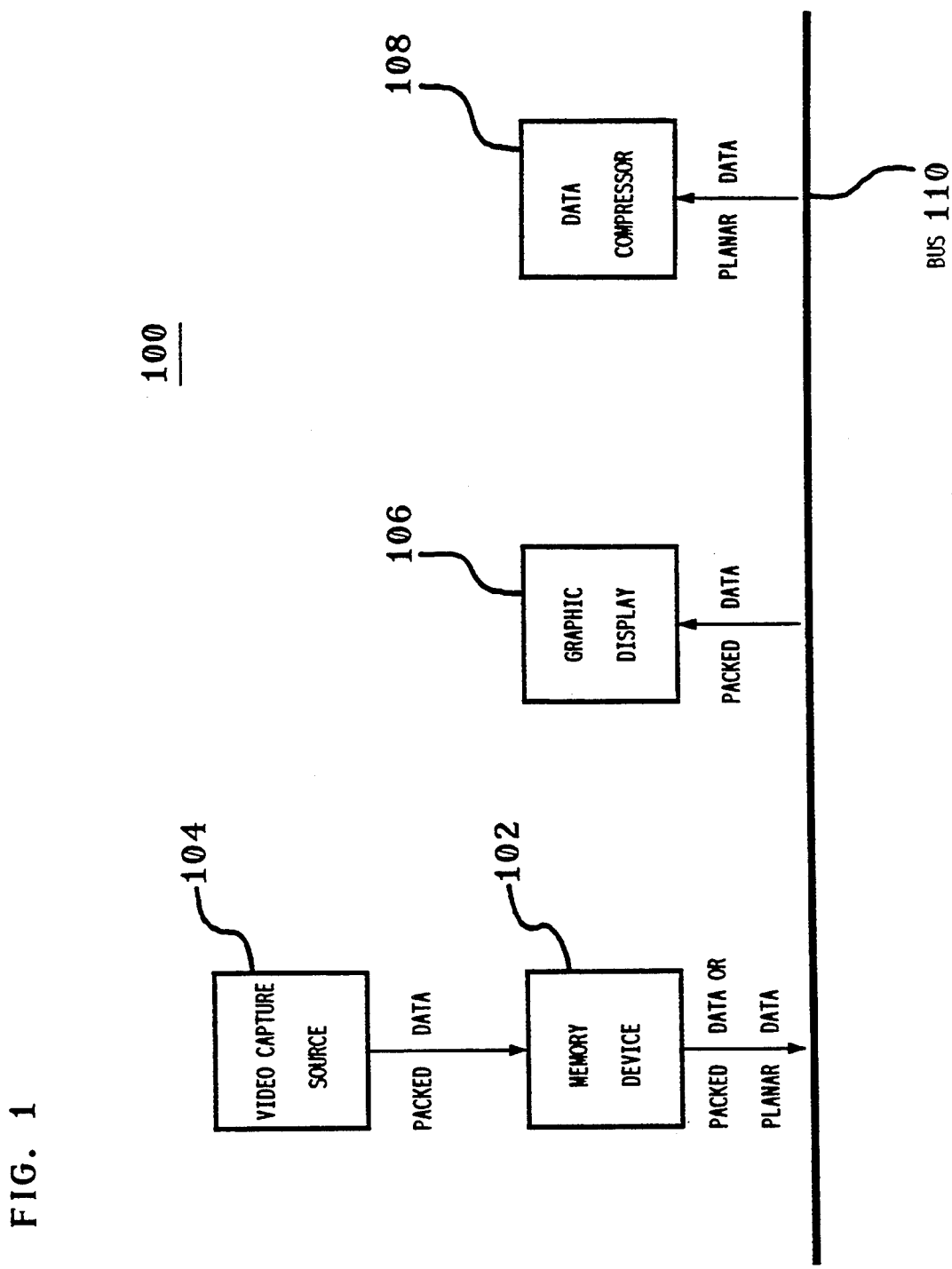
FIG. 1 is a block diagram of a digital video system containing a memory device according to a preferred embodiment of the present invention.

Referring now to FIG. 1, there is shown a block diagram of a digital video system 100 containing a memory device 102 according to a preferred embodiment of the present invention. Digital video system 100 includes video capture source 104, memory device 102, graphic display 106, data compressor 108, and data bus 110.

Digital video system 100 has two different modes of operation: display mode and compression mode. In either mode, video capture source 104 generates and transmits video data in a packed format to memory device 102. In display mode, memory device 102 receives the packed video data from video capture source 104 and transmits the video data to bus 110 in a packed format for receipt and display by graphic display 106. In compression mode, memory device 102 receives the packed video data from video capture source 104 and transmits the video data to bus 110 in a planar format for receipt and compression by data compressor 108.

Video capture source 104 may be a video camera or other conventional means of generating a sequence of video images and is preferably a Philips SAA7194 Digital Video Scaler and Decoder connected to an NTSC camera. Graphic display 106 may be an RGB or YUV frame buffer and is preferably the buffer disclosed in pending U.S. patent application Ser. No. 07/901,434, entitled "Visual Frame Buffer Architecture, filed Jun. 19, 1992, issued as U.S. Pat. No. 5,345,554, and assigned to the same assignee as the present application. Data compressor 108 is preferably an Intel Pentium ® or Intel i750 processor. Bus 110 may be a flexible multimedia video bus and is preferably an Intel Peripheral Component Interconnect (PCI) Bus.

Figure 2:
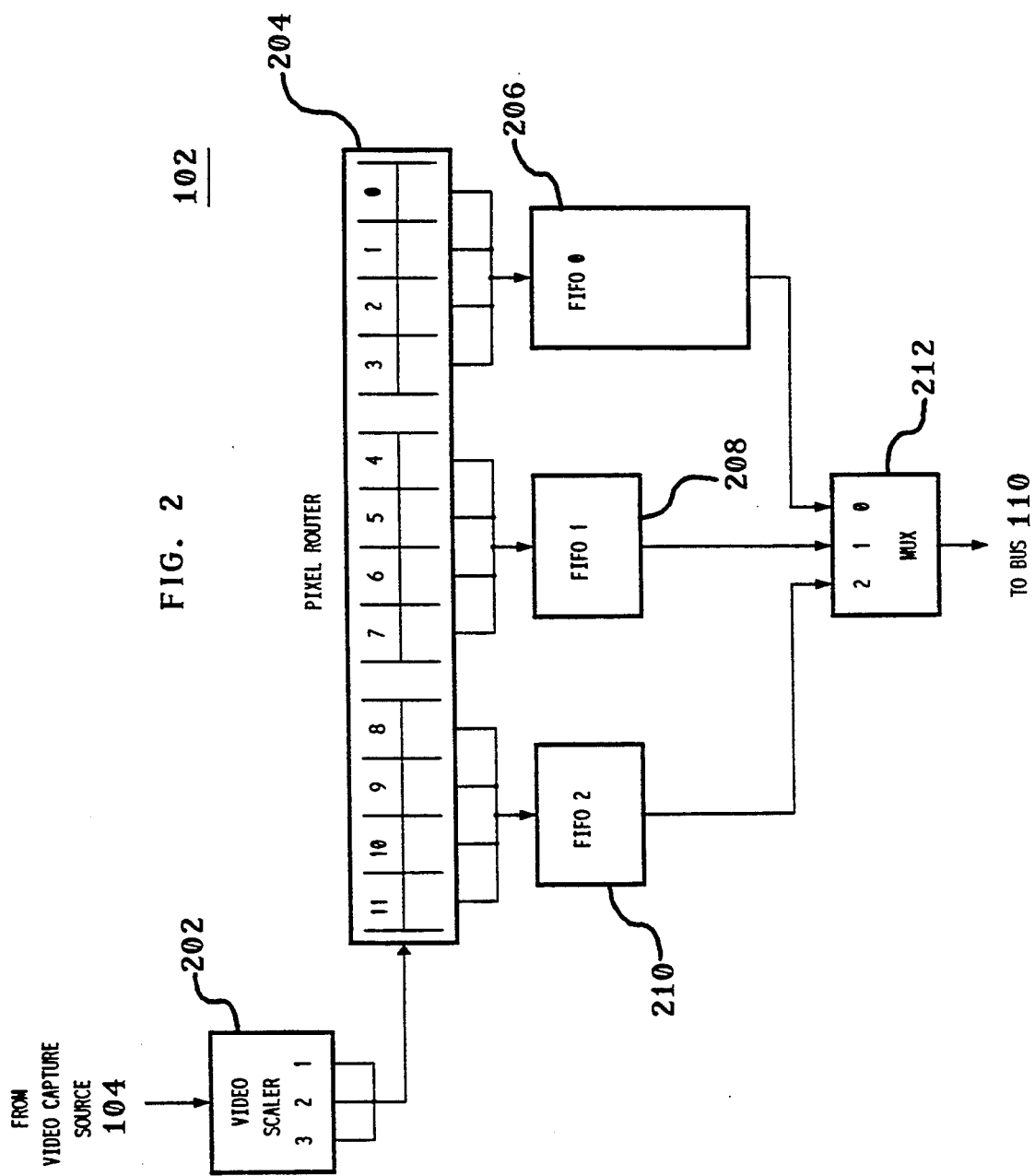
FIG. 2 is a block diagram of the memory device of the digital video system of FIG. 1.

Referring now to FIG. 2, there is shown a block diagram of memory device 102 of digital video system 100 of FIG. 1 according to a preferred embodiment of the present invention. Memory device 102 is a planar/-packed video data first-in, first-out (FIFO) memory device. Memory device 102 includes video scaler 202, pixel router 204, FIFO 0 206, FIFO 1 208, FIFO 2 210, and multiplexer (MUX) 212. In a preferred embodiment, memory device 102 is implemented in hardware.

Video scaler 202 has three 8-bit output ports 1, 2, 3. The three 8-bit bytes are combined into a single 24-bit word for transmission to pixel router 204. Video scaler 202 may be any digital video source and is preferably a Philips SAA7186 Video Scaler or a Philips SAA7194 Video Scaler and Decoder.

Pixel router 204 has twelve 8-bit registers. Pixel data in registers 0–3 are combined into a single 32-bit word for transmission to FIFO 0 206. The most significant bit (MSB) of the 32-bit word is the MSB of the 8-bit word in register 3 and the least significant bit (LSB) of the 32-bit word is the LSB of the 8-bit word in register 0. Similarly, pixel data in registers 4–7 are combined into a single 32-bit word for transmission to FIFO 1 208 and pixel data in registers 8–11 are combined into a single 32-bit word for transmission to FIFO 2 210. Pixel router 204 preferably comprises twelve conventional 4:1 multiplexers.

FIFO 0 206, FIFO 1 208, and FIFO 2 210 are each first-in, first-out memory devices that store a particular number of 32-bit words. Where fsize is the total number of 32-bit words that can be stored in all three FIFO's, FIFO 0 206 preferably has a depth of fsize/2 and both FIFO 1 208 and FIFO 2 210 preferably have depths of fsize/4. In a preferred embodiment in which fsize is 256, FIFO 0 206 holds 128 32-bit words, FIFO 1 208 holds 64 32-bit words, and FIFO 2 210 holds 64 32-bit words. The three FIFO's may be any conventional 32-bit word FIFO's. Those skilled in the art will understand that fsize may be dictated in part by the characteristics of bus 110.

Multiplexer 212 has three input ports 0, 1, and 2 for receiving 32-bit words from FIFO 0 206, FIFO 1 208, and FIFO 2 210, respectively. Multiplexer 212 selectively receives one 32-bit word at a time from one of the three FIFO's and transmits that 32-bit word to bus 110 of digital video system 100 of FIG. 1. In a preferred embodiment, multiplexer 212 unloads data from the three FIFO's when the amount of data in FIFO 0 206 exceeds a specified threshold value. The threshold value is preferably selected in accordance with characteristics of bus 110. Multiplexer 212 unloads data selectively from each FIFO from bottom to top one 32-bit word at a time and transmits the 32-bit data to bus 110. Multiplexer 212 may be any conventional 3:1 data multiplexer.

Memory device 102 preferably has (at least) six modes of operation: RGB24 packed mode, RGB16 packed mode, YUV16 packed mode, YUV16 planar mode, YUV12 planar mode, and YUV9 planar mode. An operator selects the mode of operation to meet his or her specific needs. One of the three packed modes may be selected to support the display mode of digital video system 100, while one of the three planar modes may be selected to support the compression mode of digital video system 100. These six modes of memory device 102 are described in further detail in conjunction with FIGS. 3–10.

RGB24 Packed Mode

Figure 3:
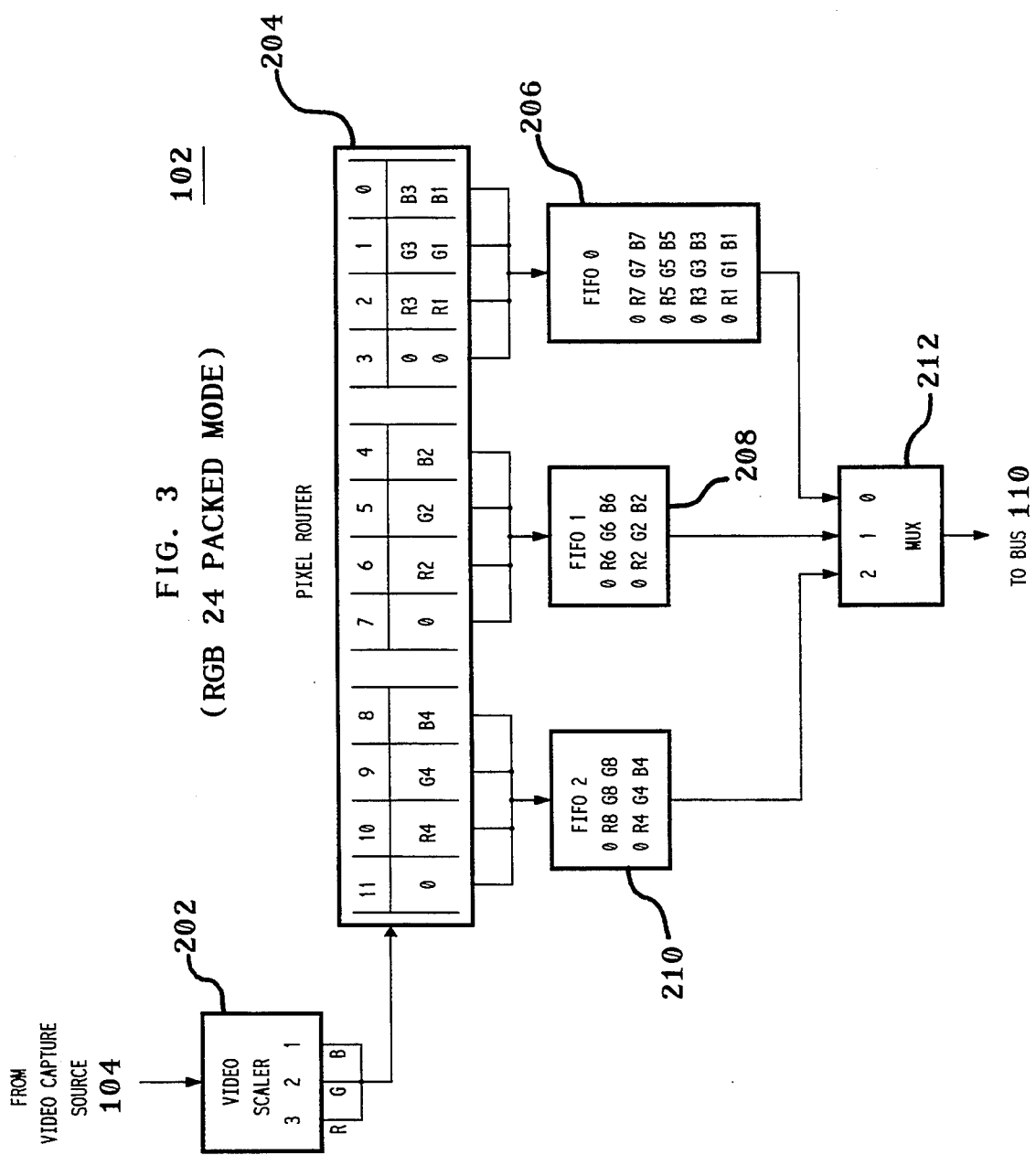
FIG. 3 is a representation of the processing of the memory device of FIG. 2 in RGB24 packed mode.

Referring now to FIG. 3, there is shown a representation of the processing of memory device 102 in RGB24 packed mode. In RGB24 video format, each pixel is represented by an 8-bit R value, an 8-bit G value, and an 8-bit B value. In RGB24 packed mode, memory device 102 receives video data from video capture source 104 in RGB24 packed format and transmits video data to bus 110 in RGB24 packed format.

More particularly, in RGB24 packed mode, video scaler 202 receives three 8-bit words of RGB data for each pixel in packed format and transmits these three words to pixel router 204. In this specification, Ri, Gi, and Bi refer to the 8-bit R, G, and B values for pixel i. Video scaler 202 transmits the three 8-bit words Ri, Gi, and Bi on ports 3, 2, and 1, respectively. These three 8-bit words are combined to form a single 24-bit word corresponding to (Ri Gi Bi) for transmission to pixel router 204.

Pixel router 204 receives the 24-bit word (R1 G1 B1) and stores R1, G1, and B1 for pixel 1 in 8-bit registers 2, 1, and 0, respectively. Pixel router 204 also preferably stores a 0 value in 8-bit register 3 for pixel 1. Pixel router 204 then transmits the 32-bit word corresponding to (0 R1 G1 B1) to FIFO 0 206.

Pixel router 204 then stores R2, G2, and B2 for pixel 2 in 8-bit registers 6, 5, and 4, respectively. Pixel router 204 also preferably stores a 0 value in 8-bit register 7 for pixel 2. Pixel router 204 then transmits the 32-bit word corresponding to (0 R2 G2 B2) to FIFO 1 208.

Pixel router 204 then stores R3, G3, and B3 for pixel 3 in 8-bit registers 2, 1, and 0, respectively. Pixel router 204 also preferably stores a 0 value in 8-bit register 3 for pixel 3. Pixel router 204 then transmits the 32-bit word corresponding to (0 R2 G2 B2) to FIFO 0 208.

For pixel 4, pixel router 204 stores R4, G4, and B4 in 8-bit registers 10, 9, and 8, respectively. Pixel router 204 also preferably stores a 0 value in 8-bit register 11 for pixel 4. Pixel router 204 then transmits the 32-bit word corresponding to (0 R4 G4 B4) to FIFO 2 210.

Pixel router 204 then repeats this sequence of processing for pixels 5 through 8. In the example of FIG. 3, fsize is eight. In this example, after processing pixel 8, FIFO 0 206, FIFO 1 208, and FIFO 2 210 are full. From top to bottom, FIFO 0 206 contains (0 R7 G7 B7), (0 R5 G5 B5), (0 R3 G3 B3), and (0 R1 G1 B1); FIFO 1 208 contains (0 R6 G6 B6) and (0 R2 G2 B2); and FIFO 2 210 contains (0 R8 G8 B8) and (0 R4 G4 B4).

When the FIFO's are ready to be unloaded, multiplexer 212 preferably selects FIFO's in the sequence (FIFO 0, FIFO 1, FIFO 0, FIFO 2) for unloading one 32-bit word at a time. In this way, multiplexer 212 transmits-the RGB24 data to bus 110 in a packed format for receipt by graphic display 106. Memory device 102 continues to receive and process subsequent pixel data in similar fashion.

RGB16 Packed Mode

Figure 4:
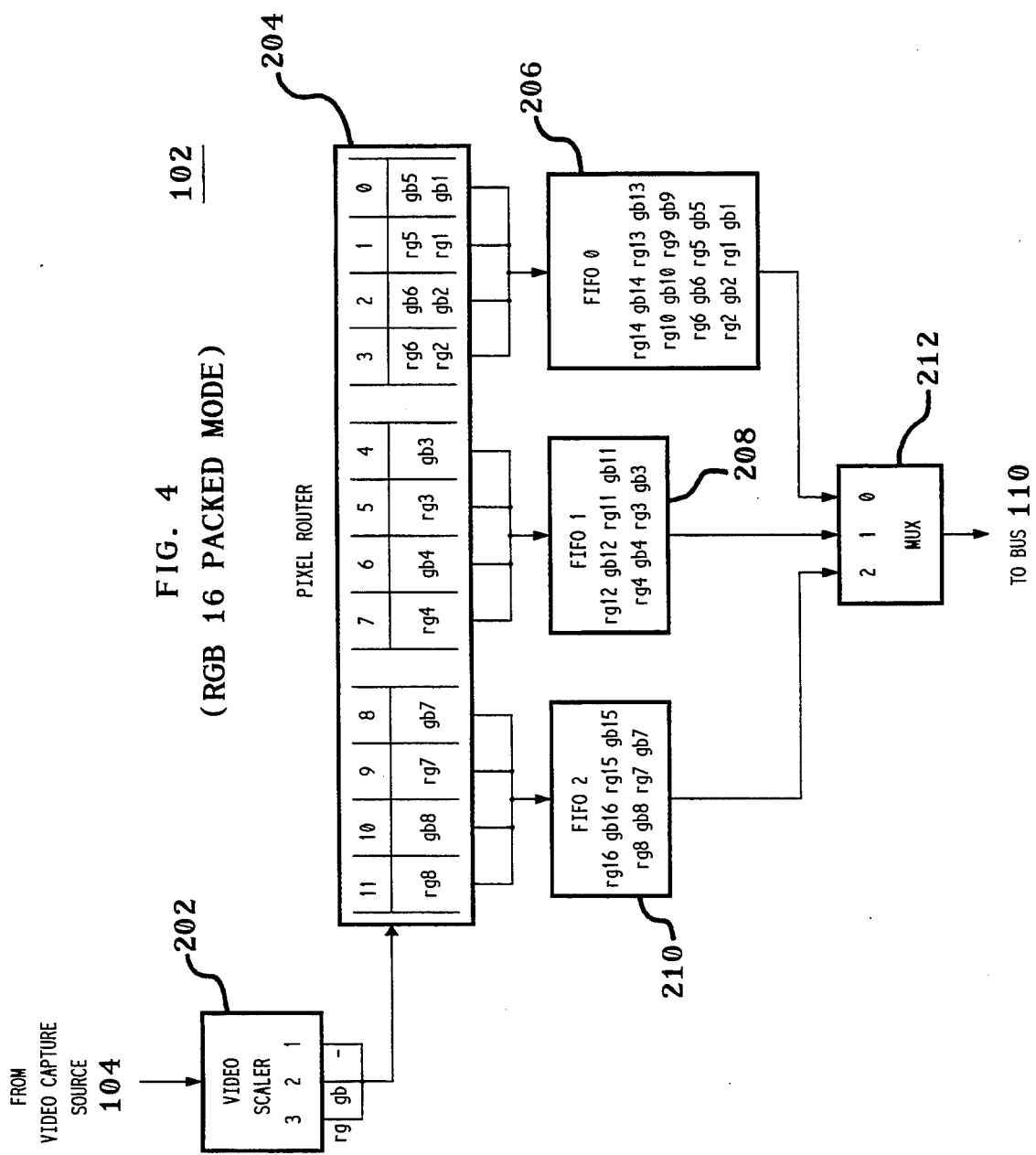
FIG. 4 is a representation of the processing of the memory device of FIG. 2 in RGB16 packed mode.

Referring now to FIG. 4, there is shown a representation of the processing of memory device 102 in RGB16 packed mode. In RGB16 video format, each pixel is represented by a 5-bit R value, a 5-bit G value, and a 5-bit B value. In RGB16 packed mode, memory device 102 receives video data from video capture source 104 in RGB16 packed format and transmits video data to bus 110 in RGB16 packed format.

More particularly, in RGB16 packed mode, video scaler 202 receives three 5-bit values of RGB data for each pixel in packed format and transmits these data as two 8-bit words (rgi and gbi) to pixel router 204. In this specification, rgi and gbi are 8-bit words, such that:

$$rgi = (0\ R4\ R3\ R2\ R1\ R0\ G4\ G3)$$

and $$gbi = (G2\ G1\ G0\ B4\ B3\ B2\ B1\ B0),$$

where R4, G4, and B4 are the MSB's of the 5-bit R, G, and B values, respectively; 0 is the MSB of rgi; and G2 is the MSB of gbi. Video scaler 202 transmits the two 8-bit words rgi and gbi on ports 3 and 2, respectively, with port 1 preferably providing a 0 value. These two 8-bit words are combined to form a single 24-bit word corresponding to (rgi gbi 0) for transmission to pixel router 204.

Pixel router 204 receives the 24-bit word (rg1 gb1 0) and stores rg1 and gb1 for pixel 1 in registers 1 and 0, respectively. For pixel 2, pixel router 204 stores rg2 and gb2 in registers 3 and 2, respectively. Pixel router 204 then transmits the 32-bit word corresponding to (rg2 gb2 rg1 gb1) to FIFO 0 206.

Pixel router 204 then stores rg3 and gb3 for pixel 3 in registers 5 and 4, respectively. For pixel 4, pixel router 204 stores rg4 and gb4 in registers 7 and 6, respectively. Pixel router 204 then transmits the 32-bit word corresponding to (rg4 gb4 rg3 gb3) to FIFO 1 208.

Pixel router 204 then stores rg5 and gb5 for pixel 5 in registers 1 and 0, respectively. For pixel 6, pixel router 204 stores rg6 and gb6 in registers 3 and 2, respectively. Pixel router 204 then transmits the 32-bit word corresponding to (rg6 gb6 rg5 gb5) to FIFO 0 208.

Pixel router 204 then stores rg7 and gb7 for pixel 7 in registers 9 and 8, respectively. For pixel 8, pixel router 204 stores rg8 and gb8 in registers 11 and 10, respectively. Pixel router 204 then transmits the 32-bit word corresponding to (rg8 gb8 rg7 gb7) to FIFO 2 210.

Pixel router 204 then repeats this sequence of processing for pixels 9 through 16. In the example of FIG. 4 in which fsize is eight, after processing pixel 16, FIFO 0 206, FIFO 1 208, and FIFO 2 210 are full. From top to bottom, FIFO 0 206 contains (rg14 gb14 rg13 gb13), (rg10 gb10 rg9 gb9), (rg6 gb6 rg5 gb5), and (rg2 gb2 rg1 gb1); FIFO 1 208 contains (rg12 gb12 rg11 gb11) and (rg4 gb4 rg3 gb3); and FIFO 2 210 contains (rg16 gb16 rg15 gb15) and (rg8 gb8 rg7 gb7).

When the FIFO's are ready to be unloaded, multiplexer 212 preferably selects FIFO's in the sequence (FIFO 0, FIFO 1, FIFO 0, FIFO 2) for unloading one 32-bit word at a time. In this way, multiplexer 212 transmits the RGB16 data to bus 110 in a packed format for receipt by graphic display 106. Memory device 102 continues to receive and process subsequent pixel data in similar fashion.

YUV16 Packed Mode

Figure 5:
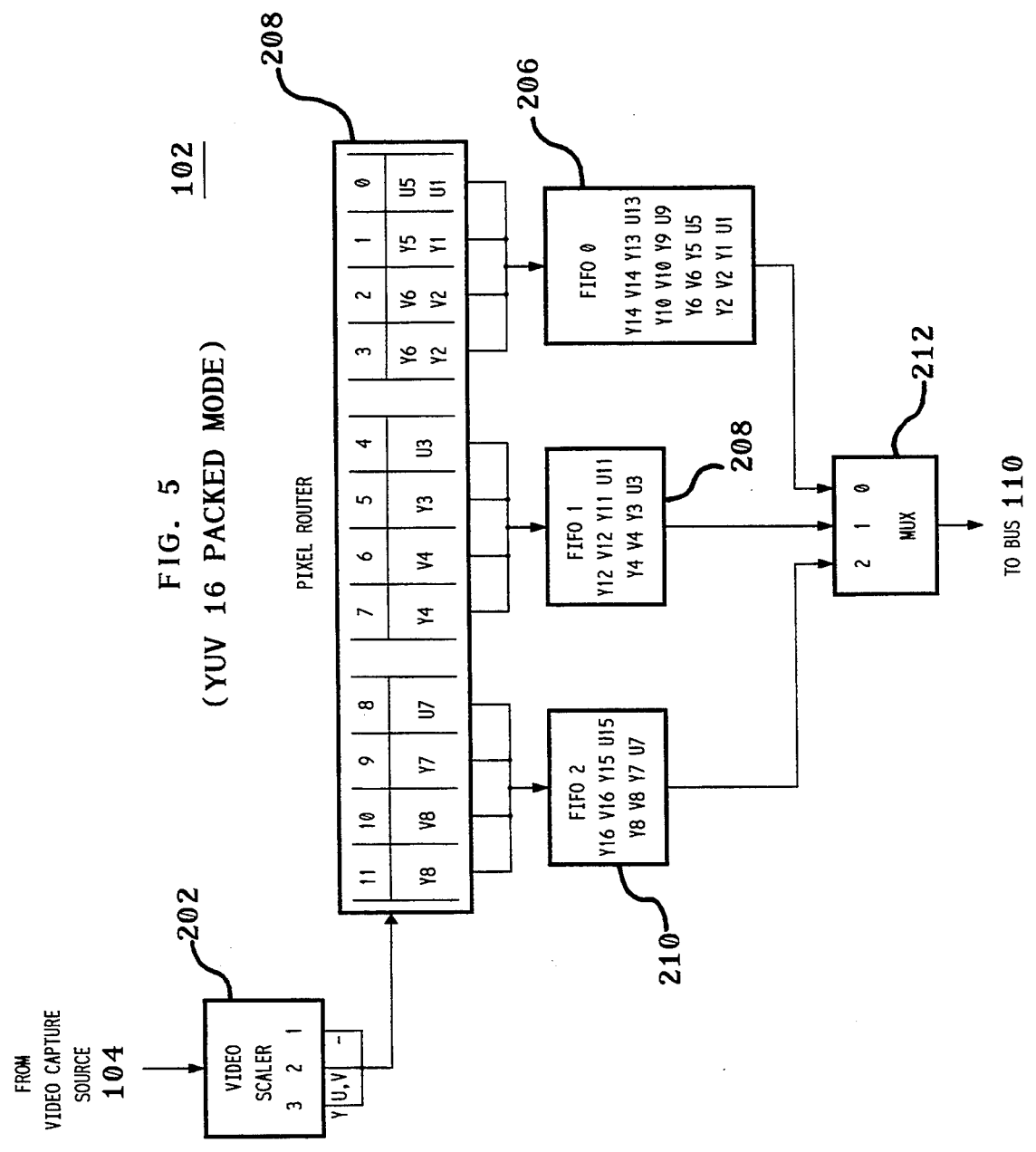

Referring now to FIG. 5, there is shown a representation of the processing of memory device 102 in YUV16 packed mode. In YUV16 video format, each pixel is represented by an 8-bit Y value and either an 8-bit U value or an 8-bit V value. That is, every pixel has a Y value, every odd-numbered pixel (where pixel 1 is the first pixel) has a U value, and every even-numbered pixel has a V value. In YUV16 packed mode, memory device 102 receives video data from video capture source 104 in YUV16 packed format and transmits video data to bus 110 in YUV16 packed format.

More particularly, in YUV16 packed mode, video scaler 202 receives two 8-bit words of YUV data for each pixel (either (Yi and Ui) or (Yi+1 and Vi+1)) in packed format and transmits these data to pixel router 204. In this specification, Yi and Ui refer to the 8-bit Y and U values for odd pixel i and Yi+1 and Vi+1 refer to the 8-bit Y and V values for even pixel i+1. For pixel i, video scaler 202 transmits the two 8-bit words Yi and Ui on ports 3 and 2, respectively, with port 1 preferably providing a 0 value. Similarly, for pixel i+1, video scaler 202 transmits the two 8-bit words Yi+1 and Vi+1 on ports 3 and 2, respectively, with port 1 preferably providing a 0 value. The two 8-bit words are combined to form a single 24-bit word corresponding to either (Yi Ui 0) or (Yi+1 Vi+1 0) for transmission to pixel router 204.

Pixel router 204 receives the 24-bit word (Y1 U1 0) and stores Y1 and U1 for pixel 1 in registers 1 and 0, respectively. For pixel 2, pixel router 204 receives the 24-bit word (Y2 V2 0) and stores Y2 and V2 in registers 3 and 2, respectively. Pixel router 204 then transmits the 32-bit word corresponding to (Y2 V2 Y1 U1) to FIFO 0 206.

Pixel router 204 then stores Y3 and U3 for pixel 3 in registers 5 and 4, respectively. For pixel 4, pixel router 204 stores Y4 and V4 in registers 7 and 6, respectively. Pixel router 204 then transmits the 32-bit word corresponding to (Y4 V4 Y3 U3) to FIFO 1 208.

Pixel router 204 then stores Y5 and U5 for pixel 5 in registers 1 and 0, respectively. For pixel 6, pixel router 204 stores Y6 and V6 in registers 3 and 2, respectively. Pixel router 204 then transmits the 32-bit word corresponding to (Y6 V6 Y5 U5) to FIFO 0 208.

Pixel router 204 then stores Y7 and U7 for pixel 7 in registers 9 and 8, respectively. For pixel 8, pixel router 204 stores Y8 and V8 in registers 11 and 10, respectively. Pixel router 204 then transmits the 32-bit word corresponding to (Y8 V8 Y7 U7) to FIFO 2 210.

Pixel router 204 then repeats this sequence of processing for pixels 9 through 16. In the example of FIG. 5 in which fsize is eight, after processing pixel 16, FIFO 0 206, FIFO 1 208, and FIFO 2 210 are full. From top to bottom, FIFO 0 206 contains (Y14 V14 Y13 U13), (Y10

V10 Y9 U9), (Y6 V6 Y5 U5), and (Y2 V2 Y1 U1); FIFO 1 208 contains (Y12 V12 Y11 U11) and (Y4 V4 Y3 U3); and FIFO 2 210 contains (Y16 V16 Y15 U15) and (Y8 V8 Y7 U7).

When the FIFO's are ready to be unloaded, multiplexer 212 preferably selects FIFO's in the sequence (FIFO 0, FIFO 1, FIFO 0, FIFO 2) for unloading one 32-bit word at a time. In this way, multiplexer 212 transmits the YUV16 data to bus 110 in a packed format for receipt by graphic display 106. Memory device 102 continues to receive and process subsequent pixel data in similar fashion.

YUV16 Planar Mode

Figure 6:
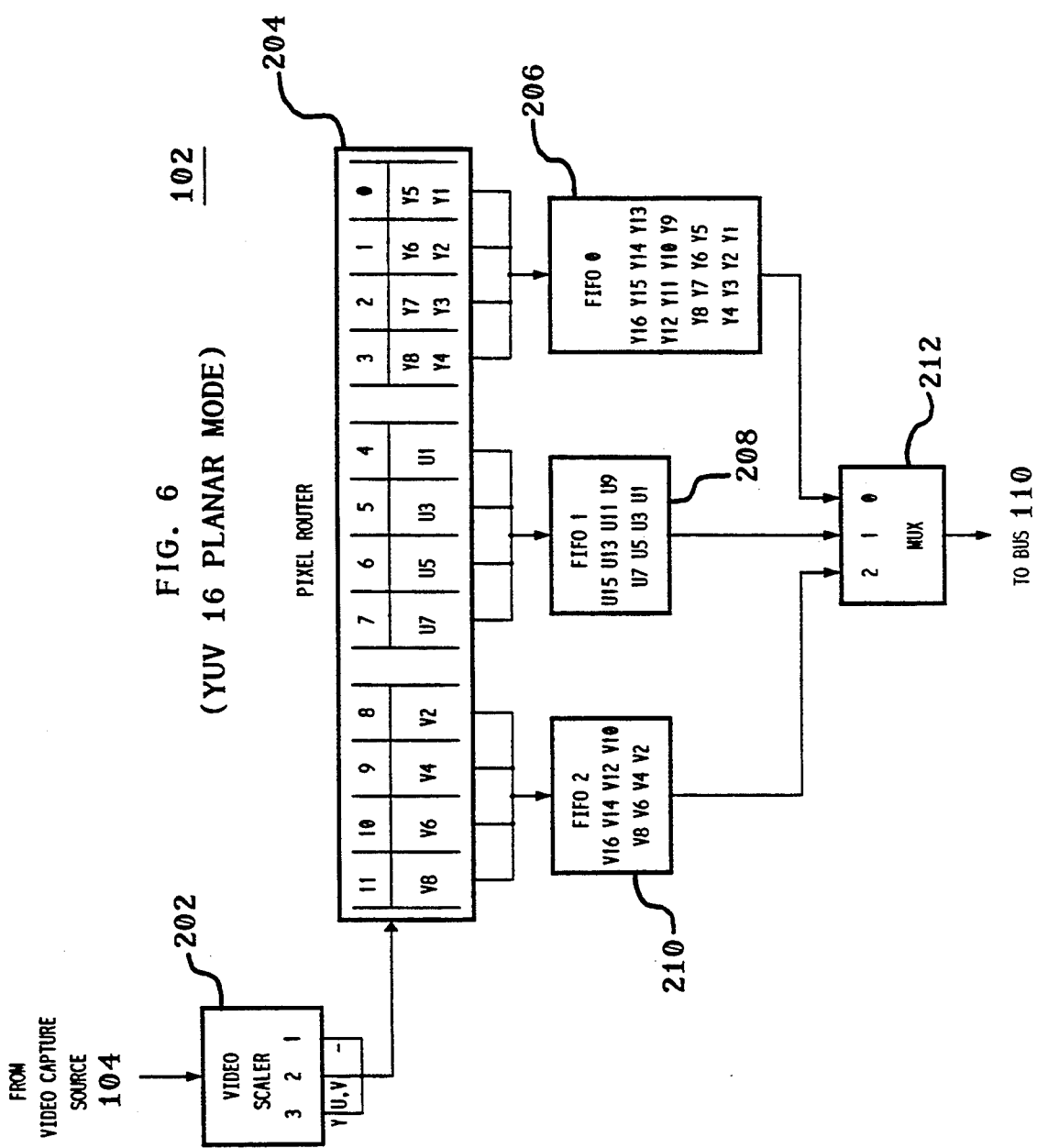
FIG. 6 is a representation of the processing of the memory device of FIG. 2 in YUV16 planar mode.

Referring now to FIG. 6, there is shown a representation of the processing of memory device 102 in YUV16 planar mode. In YUV16 planar mode, memory device 102 receives video data from video capture source 104 in YUV16 packed format and transmits video data to bus 110 in a planar format.

More particularly, in YUV16 planar mode, video scaler 202 receives packed video data in the same packed format as in YUV16 packed mode and transmits these data to pixel router 204. Thus, for pixel i, video scaler 102 transmits the two 8-bit words Yi and Ui on ports 3 and 2, respectively, with port 1 preferably providing a 0 value. Similarly, for pixel i+1, video scaler 202 transmits the two 8-bit words Yi+1 and Vi+1 on ports 3 and 2, respectively, with port 1 preferably providing a 0 value. The two 8-bit words are combined to form a single 24-bit word corresponding to either (Yi Ui 0) or (Yi+1 Vi+1 0) for transmission to pixel router 204.

Pixel router 204 receives the 24-bit word (Y1 U1 0) and stores Y1 and U1 for pixel 1 in registers 0 and 4, respectively. For pixel 2, pixel router 204 receives the 24-bit word (Y2 V2 0) and stores Y2 and V2 in registers 1 and 8, respectively. For pixel 3, pixel router 204 stores Y3 and U3 in registers 2 and 5, respectively. For pixel 4, pixel router 204 stores Y4 and V4 in registers 3 and 9, respectively. Pixel router 204 then transmits the 32-bit word corresponding to (Y4 Y3 Y2 Y1) stored in registers 3 through 0 to FIFO 0 206.

For pixel 5, pixel router 204 stores Y5 and U5 in registers 0 and 6, respectively. For pixel 6, pixel router 204 stores Y6 and V6 in registers 1 and 10, respectively. For pixel 7, pixel router 204 stores Y7 and U7 in registers 2 and 7, respectively. For pixel 8, pixel router 204 stores Y8 and V8 in registers 3 and 11, respectively. Pixel router 204 then transmits the 32-bit word corresponding to (Y8 Y7 Y6 Y5) stored in registers 3 through 0 to FIFO 0 206. Pixel router 204 also transmits the 32-bit word corresponding to (U7 U5 U3 U1) stored in registers 7 through 4 to FIFO 1 208 and the 32-bit word corresponding to (V8 V6 V4 V2) stored in registers 11 through 8 to FIFO 2 210.

Pixel router 204 then repeats this sequence of processing for pixels 9 through 16. In the example of FIG. 6 in which fsize is eight, after processing pixel 16, FIFO 0 206, FIFO 1 208, and FIFO 2 210 are full. From top to bottom, FIFO 0 206 contains (Y16 Y15 Y14 Y13), (Y12 Y11 Y10 Y9), (Y8 Y7 Y6 Y5), and (Y4 Y3 Y2 Y1); FIFO 1 208 contains (U15 U13 U11 U9) and (U7 U5 U3 U1); and FIFO 2 210 contains (V16 V14 V12 V10) and (V8 V6 V4 V2).

When the FIFO's are ready to be unloaded, multiplexer 212 preferably unloads most if not all of FIFO 0 206, then most if not all of FIFO 1 208, then most if not all of FIFO 2 210. In this way, multiplexer 212 transmits the YUV16 data to bus 110 in three distinct data streams (i.e., sets of data) of only Y, only U, and only V data (i.e., in planar format) for receipt by data compressor 108. Memory device 102 continues to receive and process subsequent pixel data in similar fashion.

YUV 12 Planar Mode

Figure 7:
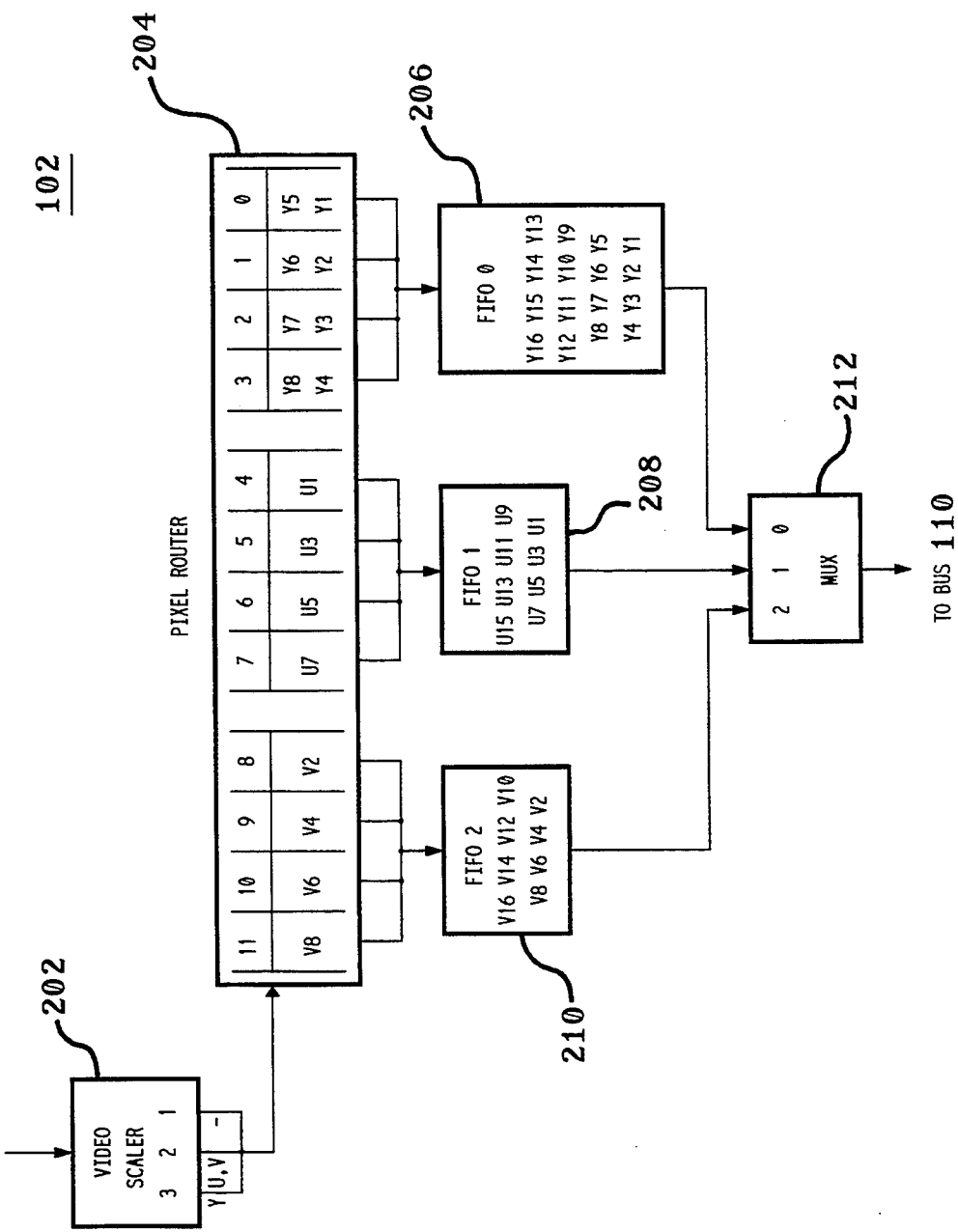
FIGS. 7 and 8 are representations of the processing of the memory device of FIG. 2 in YUV 12 planar mode.
Figure 8:
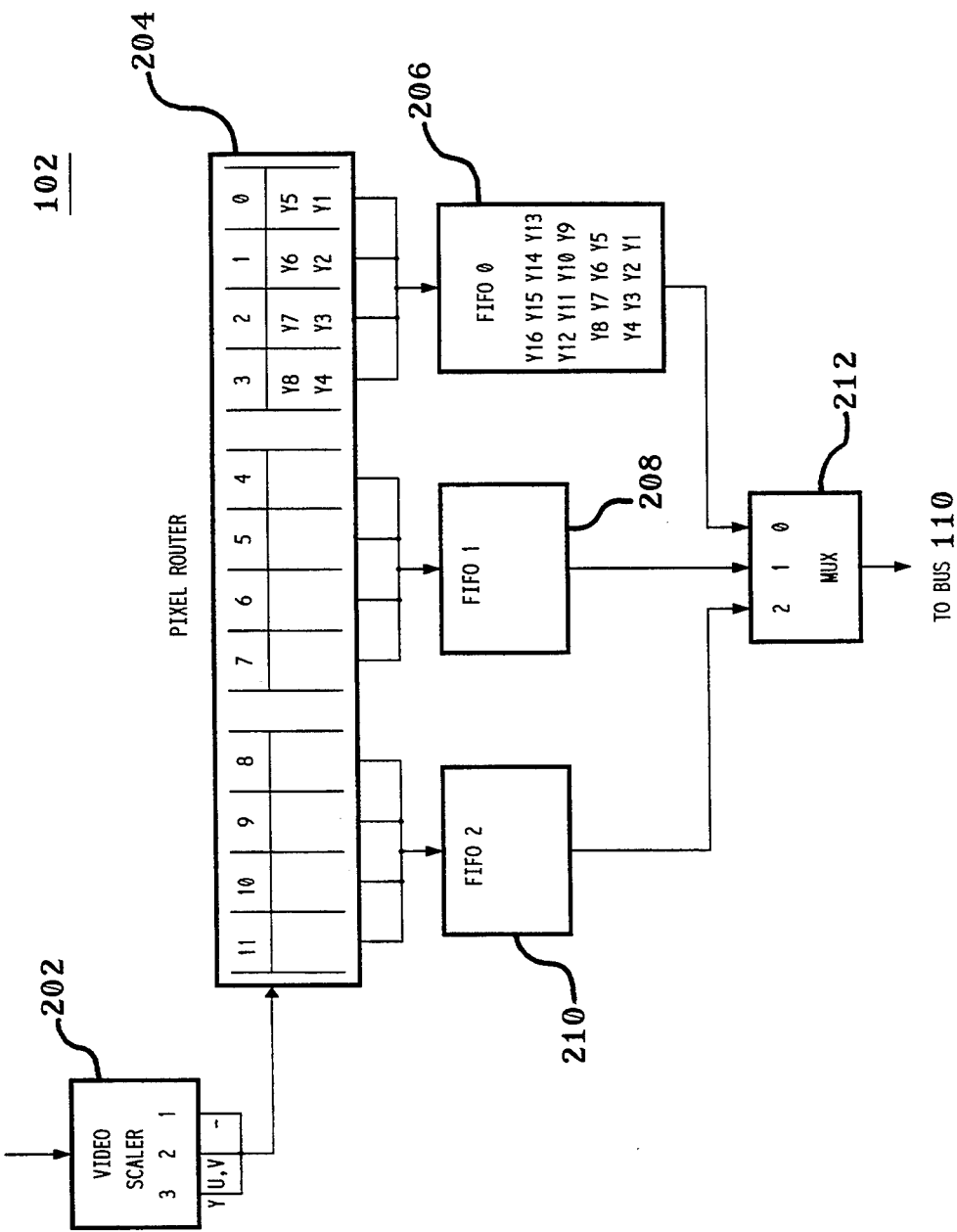

Referring now to FIGS. 7 and 8, there are shown representations of the processing of memory device 102 in YUV12 planar mode. In YUV 12 planar mode, memory device 102 receives video data from video capture source 104 in YUV16 packed format and transmits video data to bus 110 in YUV 12 planar format. In YUV 12 planar format, every (2×2) pixel block is represented by four Y values, one U value, and one V value.

In a preferred embodiment, pixel router 204 processes data for odd rows (i.e., the top rows of the (2×2) pixel blocks) differently from even rows (i.e., the bottom rows of the (2×2) pixel blocks). FIG. 7 represents the processing of the odd rows and FIG. 8 represents the processing of the even rows. Those skilled in the art will understand that, in YUV 12 planar mode, the odd rows are processed identically to the processing of YUV16 planar mode as described earlier in this specification in conjunction with FIG. 6.

Referring again to FIG. 8, for the even rows, pixel router 204 receives YUV16 packed format data, discards all of the U and V data, and stores only the Y data. In particular, pixel router 204 receives the 24-bit word (Y1 U10), discards U1, and stores Y1 for pixel 1 in register 0. For pixel 2, pixel router 204 receives the 24-bit word (Y2 V2 0), discards V2, and stores Y2 in register 1. For pixel 3, pixel router 204 discards U3 and stores Y3 register 2. For pixel 4, pixel router 204 discards V4 and stores Y4 in register 3. Pixel router 204 then transmits the 32-bit word corresponding to (Y4 Y3 Y2 Y1) stored in registers 3 through 0 to FIFO 0 206.

Pixel router 204 then repeats this sequence of processing for pixels 5 through 16. In the example of FIG. 8 in which fsize is eight, after processing pixel 16, FIFO 0 206 is full and FIFO 1 208 and FIFO 2 210 are empty. From top to bottom, FIFO 0 206 contains (Y16 Y15 Y14 Y13), (Y12 Y11 Y10 Y9), (Y8 Y7 Y6 Y5), and (Y4 Y3 Y2 Y1).

When the FIFO 0 206 is ready to be unloaded, multiplexer 212 preferably unloads most if not all of FIFO 0 206. In this way, for the even rows, multiplexer 212 transmits the Y data to bus 110 in a single data stream of only Y for receipt by data compressor 108. Memory device 102 continues to receive and process subsequent pixel data in similar fashion to that shown in FIGS. 7 and 8 for subsequent odd and even rows of the video data.

YUV9 Planar Mode

Figure 9:
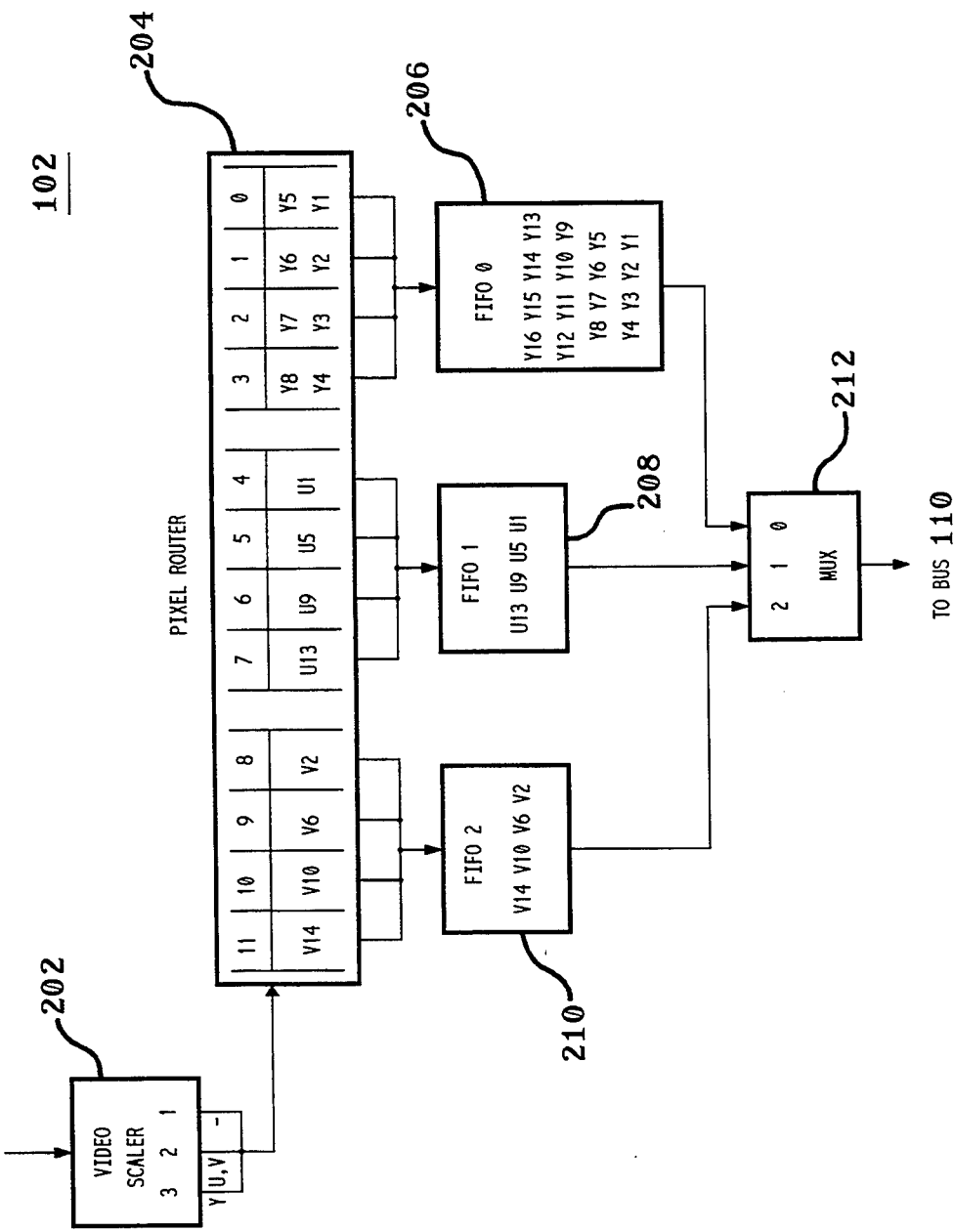
FIGS. 9 and 10 are representations of the processing of the memory device of FIG. 2 in YUV9 planar mode.
Figure 10:
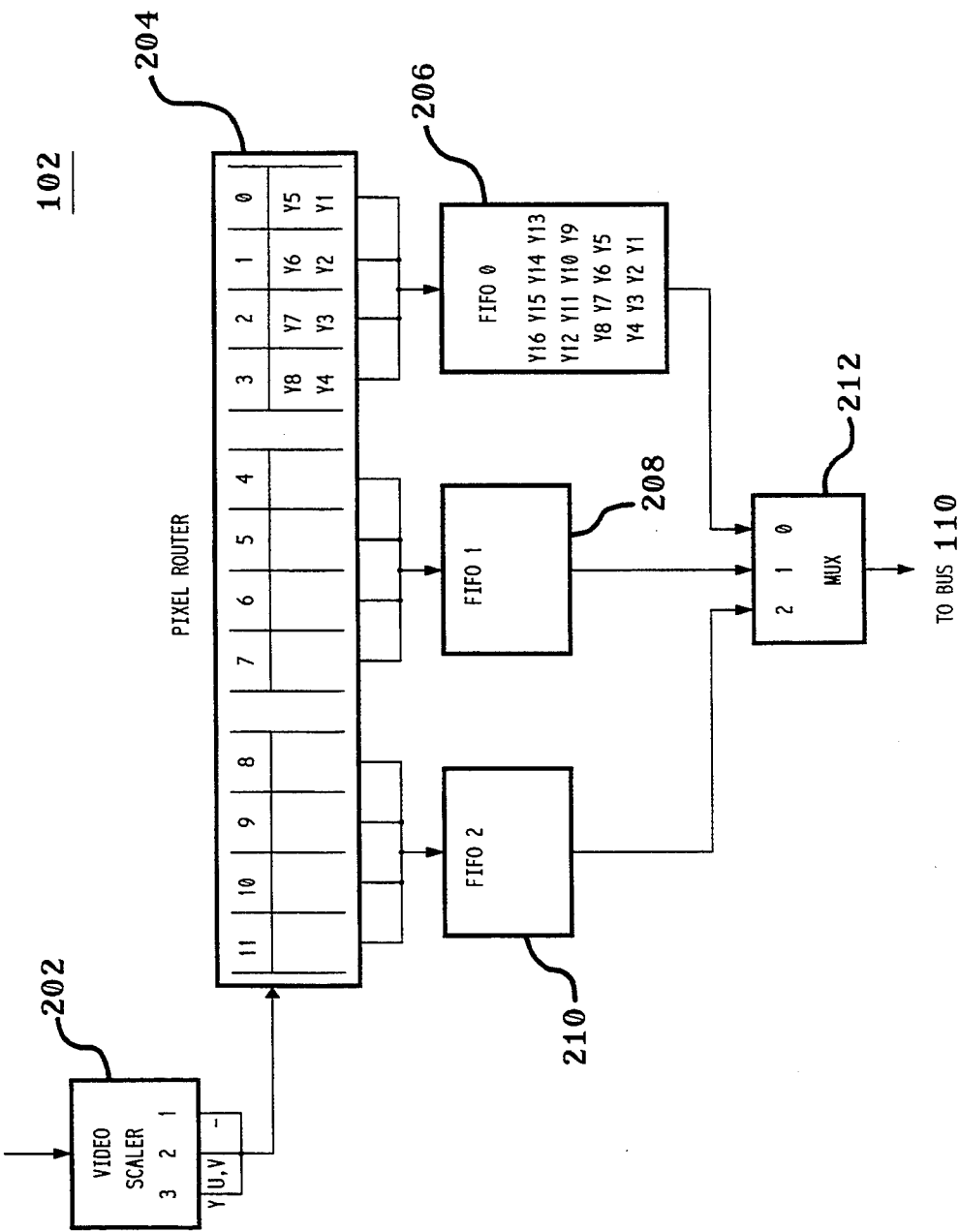

Referring now to FIGS. 9 and 10, there are shown representations of the processing of memory device 102 in YUV9 planar mode. In YUV9 planar mode, memory device 102 receives video data from video capture source 104 in YUV16 packed format and transmits video data to bus 110 in YUV9 planar format. In YUV9 planar format, every (4×4) pixel block is represented by sixteen Y values, one U value, and one V value.

In a preferred embodiment, pixel router 204 processes data for the first of every four rows (i.e., row 1 of the (4×4) pixel blocks) differently from the other three rows (i.e., rows 2–4 of the (4×4) pixel blocks). FIG. 9 represents the processing of row 1 and FIG. 10 represents the processing of rows 2–4. Those skilled in the art will understand that, in YUV9 planar mode, rows 2–4 are processed identically to the processing of the even rows of YUV 12 planar mode as described earlier in this specification in conjunction with FIG. 8.

Referring again to FIG. 9, for row 1, pixel router 204 receives YUV16 packed format data, discards half of the U and V data, stores the other half of the U and V data and all of the Y data. In particular, pixel router 204 receives the 24-bit word (Y1 U1 0) and stores Y1 and U1 for pixel 1 in registers 0 and 4, respectively. For pixel 2, pixel router 204 receives the 24-bit word (Y2 V2 0) and stores Y2 and V2 in registers 1 and 8, respectively. For pixel 3, pixel router 204 receives the 24-bit word (Y3 U3 0), discards U3, and stores Y3 in register 2. For pixel 4, pixel router 204 receives the 24-bit word (Y4 V4 0), discards V4, and stores Y4 in register 3. Pixel router 204 then transmits the 32-bit word corresponding to (Y4 Y3 Y2 Y1) stored in registers 3 through 0 to FIFO 0 206.

For pixel 5, pixel router 204 stores Y5 and U5 in registers 0 and 5, respectively. For pixel 6, pixel router 204 stores Y6 and V6 in registers 1 and 9, respectively. For pixel 7, pixel router 204 discards U7 and stores Y7 in register 2. For pixel 8, pixel router 204 discards V8 and stores Y8 in register 3. Pixel router 204 then transmits the 32-bit word corresponding to (Y8 Y7 Y6 Y5) stored in registers 3 through 0 to FIFO 0 206.

For pixel 9, pixel router 204 stores Y9 and U9 in registers 0 and 6, respectively. For pixel 10, pixel router 204 stores Y10 and V10 in registers 1 and 10, respectively. For pixel 11, pixel router 204 discards U11 and stores Y11 in register 2. For pixel 12, pixel router 204 discards V12 and stores Y12 in register 3. Pixel router 204 then transmits the 32-bit word corresponding to (Y12 Y11 Y10 Y9) stored in registers 3 through 0 to FIFO 0 206.

For pixel 13, pixel router 204 stores Y13 and U13 in registers 0 and 7, respectively. For pixel 14, pixel router 204 stores Y14 and V14 in registers 1 and 11, respectively. For pixel 15, pixel router 204 discards U15 and stores Y15 in register 2. For pixel 16, pixel router 204 discards V16 and stores Y16 in register 3. Pixel router 204 then transmits the 32-bit word corresponding to (Y16 Y15 Y14 Y13) stored in registers 3 through 0 to FIFO 0 206. Pixel router 204 also transmits the 32-bit word corresponding to (U13 U9 U5 U1) stored in registers 7 through 4 to FIFO 1 208 and the 32-bit word corresponding to (V14 V10 V6 V2) stored in registers 11 through 8 to FIFO 2 210.

In the example of FIG. 6 in which fsize is eight, after processing pixel 16, FIFO 0 206 is full and FIFO 1 208, and FIFO 2 210 are half full. From top to bottom, FIFO 0 206 contains (Y16 Y15 Y14 Y13), (Y12 Y11 Y10 Y9), (Y8 Y7 Y6 Y5), and (Y4 Y3 Y2 Y1); FIFO 1 208 contains (U13 U9 U5 U1); and FIFO 2 210 contains (V14 V10 V6 V2).

When the FIFO's are ready to be unloaded, multiplexer 212 preferably unloads most if not all of FIFO 0 206, then most if not all of FIFO 1 208, then most if not all of FIFO 2 210. In this way, multiplexer 212 transmits the YUV16 data to bus 110 in three distinct data streams (i.e., sets of data) of only Y, only U, and only V data (i.e., in planar format) for receipt by data compressor 108. Memory device 102 continues to receive and process subsequent pixel data in similar fashion to that shown in FIGS. 9 and 10 for subsequent rows of the video data.

Those skilled in the art will understand that alternative preferred embodiments of the present invention may be designed to process other video data formats. Those skilled in the art will also understand that alternative embodiments of the memory device of the present invention may be designed to process data using data words with other sizes. For example, in a digital video system in which the data bus handles 16-bit words rather than the 32-bit words of digital video system 100 of FIG. 1, each word in FIFO 0, FIFO 1, and FIFO 2 is preferably only 16 bits long and the pixel router preferably has only six 8-bit registers.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A memory device for receiving video data in a packed format and for selectively converting the video data to a planar format, comprising:
   (a) a video scaler;
   (b) a pixel router, electrically connected to receive the video data from the video scaler;
   (c) a first first-in, first-out memory device (FIFO), electrically connected to receive a first subset of the video data from a first portion of the pixel router;
   (d) a second FIFO, electrically connected to receive a second subset of the video data from a second portion of the pixel router;
   (e) a third FIFO, electrically connected to receive a third subset of the video data from a third portion of the pixel router; and
   (f) a data multiplexer, electrically connected to receive the video data from the first, second, and third FIFOs, wherein:
   the video scaler receives the video data and selectively transmits the video data to the first, second, and third portions of the pixel router;
   the first, second, and third portions of the pixel router transmit the first, second, and third subsets of the video data to the first, second, and third FIFOs, respectively;
   the data multiplexer selectively receives the first, second, and third subsets of the video data from the first, second, and third FIFOs, respectively, for further transmission;
   the memory device has a planar mode for receiving the video data in a first packed format and transmitting the video data in a first planar format;
   the memory device has a packed mode for receiving the video data in a second packed format and transmitting the video data in the second packed format; and
   the first, second, and third FIFOs are used to store the video data in both the planar mode and the packed mode.

2. The memory device of claim 1, wherein:
   the depth of the second FIFO is equal to the depth of the third FIFO; and
   the depth of the first FIFO is $2^n$ times the depth of the second FIFO, wherein n is a non-negative integer.

3. The memory device of claim 2, wherein the depth of the first FIFO is two times the depth of the second FIFO.

4. The memory device of claim 1, wherein:

the first packed format is one of YUV16 packed format, YUV12 packed format, and YUV9 packed format; and the second packed format is one of RGB24 packed format, RGB16 packed format, and YUV16 packed format.

5. The memory device of claim 1, wherein:

when operated in the planar mode, the memory device receives the video data in the first packed format from a video capture source and the memory device transmits the video data in the first planar format for receipt and compression by a data compressor; and when operated in the packed mode, the memory device receives the video data in the second packed format from the video capture source and the memory device transmits the video data in the second packed format for receipt and display by a graphic display.

6. The memory device of claim 1, wherein:

the first portion of the pixel router comprises four 8-bit registers;

the second portion of the pixel router comprises four 8-bit registers;

the third portion of the pixel router comprises four 8-bit registers;

the first FIFO comprises 32-bit registers;

the second FIFO comprises 32-bit registers; and the third FIFO comprises 32-bit registers.

7. The memory device of claim 6, wherein:

the depth of the second FIFO is equal to the depth of the third FIFO;

the depth of the first FIFO is two times the depth of the second FIFO;

the first packed format is one of YUV16 packed format, YUV12 packed format, and YUV9 packed format;

the second packed format is one of RGB24 packed format, RGB16 packed format, and YUV16 packed format;

when operated in the planar mode, the memory device receives the video data in the first packed format from a video capture source and the memory device transmits the video data in the first planar format for receipt and compression by a data compressor; and when operated in the packed mode, the memory device receives the video data in the second packed format from the video capture source and the memory device transmits the video data in the second packed format for receipt and display by a graphic display.

* * * * *